No. 739,836. Patented September 29, 1903.

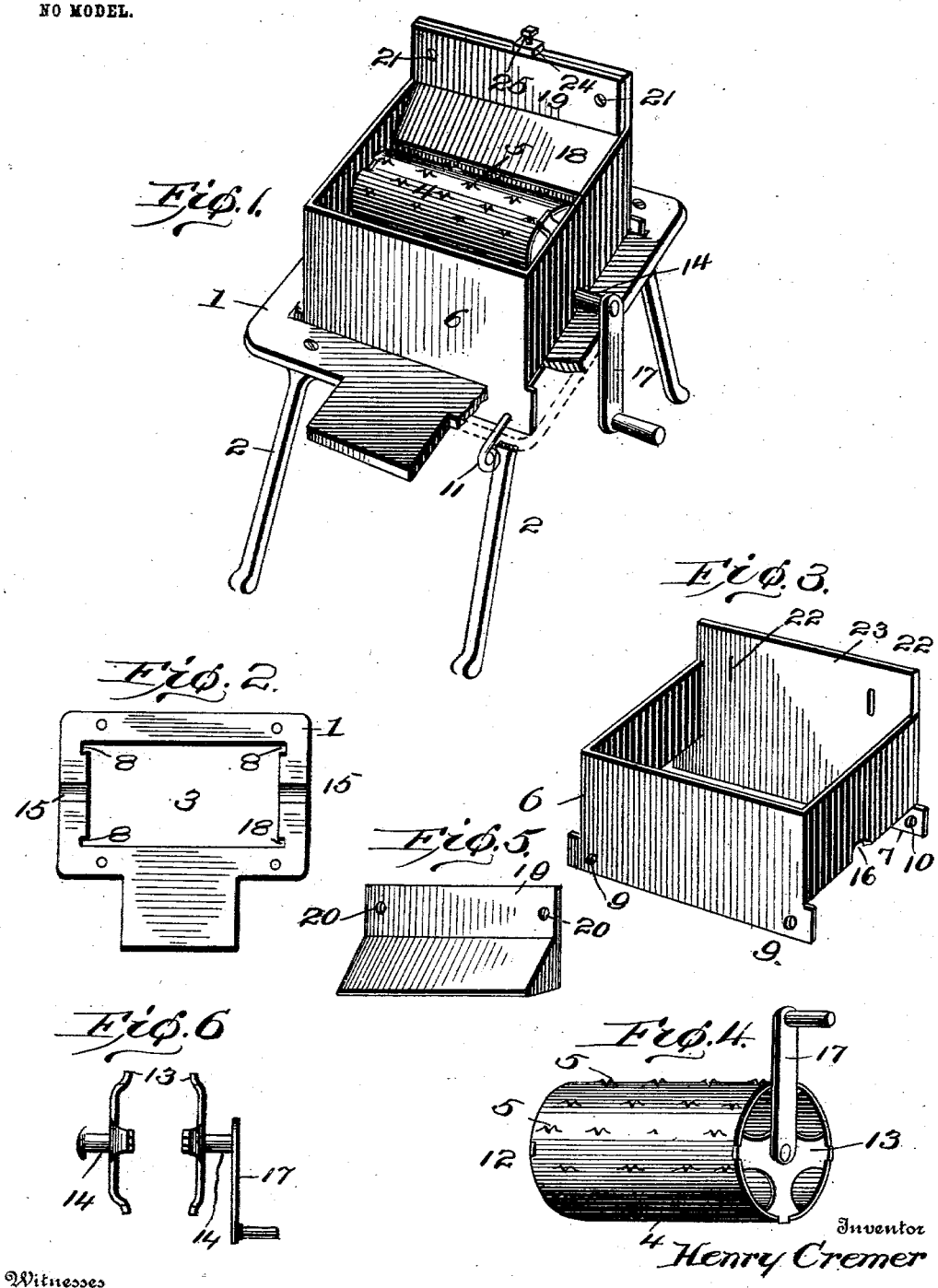

UNITED STATES PATENT OFFICE.

HENRY CREMER, OF CHICAGO, ILLINOIS.

GRATING-MACHINE.

SPECIFICATION forming part of Letters Patent No. 739,836, dated September 29, 1903.

Application filed April 30, 1903. Serial No. 155,064. (No model.)

*To all whom it may concern:*

Be it known that I, HENRY CREMER, a citizen of the United States, residing at Chicago, in the county of Cook and State of Illinois, have invented certain new and useful Improvements in Grating-Machines; and I do hereby declare the following to be a full, clear, and exact description of the invention, such as will enable others skilled in the art to which it appertains to make and use the same.

My invention relates to grating-machines; and it consists of certain novel features of combination and construction of parts, the preferred form whereof will be hereinafter clearly set forth, and pointed out in the claims.

The prime object of my invention, among others, is to provide a machine of the character specified which while of simple construction and composed of a comparatively small number of parts will be found reliably efficient in the performance of its office of grating or reducing vegetables to a pulp of finely-disintegrated condition.

A further object of my invention is to provide simple means for adjusting or controlling the degree of fineness or coarseness of the product.

A still further object is to so construct the several parts that they may be readily separated, as for the purpose of storing in a compact condition and within a limited space and also to enable the interior parts to be quickly cleansed.

Another object of my invention is to provide interchangeable grating-rollers, if desired.

Other objects and advantages will be hereinafter made clearly apparent, reference being had to the accompanying drawings, which are made a part of this application, and in which—

Figure 1 is a perspective view of my invention complete ready for use. Fig. 2 is a top plan view of the frame or supporting-table designed to carry the other parts. Fig. 3 is a perspective view of the hopper-section of my machine, which is removable from the frame. Fig. 4 is a perspective view of the grating-roller employed to coöperate with the hopper illustrated in Fig. 3. Fig. 5 shows in perspective the adjustable member adapted to direct and hold the contents of the machine in coöperative relationship with the grating-roller. Fig. 6 shows the means employed for supporting the grating roller or cylinder shown in Fig. 4.

For convenience in referring to the various details of my invention and coöperating elements numerals will be employed, the same numeral applying to a corresponding part throughout the several views.

Referring to the numerals on the drawings, 1 indicates the table-section, which may be made of any preferred material and any suitable size and provided with supporting-legs 2, as clearly shown in Fig. 1. The table-section 1 is provided with the open section or space 3, designed to receive the peripheral face or lower part of the roller or grating member 4, which in this instance consists of a piece of suitable sheet metal of any preferred character having throughout its surface a plurality of outwardly-directed and peripherally-disposed teeth 5 of any desired character and number, the object of said teeth being to tear or cut off a portion of any of the vegetables or fruit placed within the hopper-section 6, which latter is formed of proper size and material, preferably in the form presented in Fig. 3, and having upon its forward and rear edges the downwardly-extending lips 7 of proper length to be seated within the recesses 8, formed in the table at each end of the opening 3, and in order to removably secure the hopper-section within its seat thus or otherwise provided I form the registering apertures 9 and 10 in the front and rear lips 7, respectively, said registering apertures being designed to receive the locking or anchoring rod 11, adapted to be inserted in said apertures 9 immediately under the lower surface of the table-section 1, as will be readily understood.

The grating cylinder or roller 4 is provided at each end with a plurality of recesses 12, adapted or properly shaped to receive the free ends of the arms 13, said arms being integrally formed with or properly secured to an outwardly-directed journal 14, which latter are designed to rest in bearing-seats 15, formed in the upper surface of the table-section 1 at each end of the opening or space 3, as clearly shown in Fig. 2. It will also be observed that semicircular recesses 16 are formed in a contiguous part of the hopper-section 6, thus insuring that said hopper-section will fit closely down upon the table 1. One of the journals 14 is provided with a suitable crank-arm 17, whereby the grating-cylinder may be readily rotated, and it therefore becomes desirable and important to provide means for directing the vegetables, fruit, or the like into coöperation with the peripheral face of the grating-roller, and with this purpose in view I provide the guiding or directing member, (illustrated in detail in Fig. 5,) and comprising the inclined face or body-section 18, having the upwardly-directed flange or plate section 19.

The anchoring-flange 19 is provided with a pair of apertures 20, one at each end, adapted to receive a bolt 21, whereby it may be held in its operative position, inasmuch as said bolts 21 are designed to extend through slotted openings 22, formed in the upwardly-directed extension 23 of the hopper-section 6. By providing the slots 22 it will be clearly obvious that the directing member 18 may be raised or lowered, so as to insure that the vegetables, fruit, or the like will be ground or disintegrated to the proper degree of fineness. Inasmuch as the grating roller or cylinder 4 is of proper length to fit snugly within the hopper-section it follows that the outer face of the arms 13 will contact with a contiguous part of the hopper, and thereby insure that the ends of said arms cannot casually slip out of their respective recesses 12 in the edge of the grating-cylinder, and said arms may be readily disengaged from said cylinder after the hopper-section shall have been removed.

In some instances I provide for the upper edge of the flange 19, preferably near the middle portion thereof, an extension or laterally-directed lip 24, having a threaded aperture adapted to receive an adjusting-screw 25, the lower edge of which is designed to bear directly upon the upper edge of the extension 23, and it is therefore obvious that by turning said screw in the proper direction the lower end thereof will engage the edge of the extension 23, and thus raise or lower the directing member 18. In some instances, however, the set-screw 25 and the lip-section 24 may be wholly omitted or dispensed with, and I therefore reserve the right to employ either construction, as I find most desirable in practice.

It is obvious that by rotating the grating-cylinder toward the directing member 18 the vegetables or the like will be acted upon by the teeth 5, and thereby be disintegrated or separated into finely and coarsely ground particles, according to the relative position of the cylinder and said directing member 18. It is therefore obvious that the grinding capacity of my machine can be very quickly regulated or controlled, so that the product will be of any desired character, and, moreover, that my machine consists of but a comparatively small number of parts, which can be instantly separated for the purpose of cleaning or repairing and as readily reassembled each in its respective operative position, and while I have described the preferred combination and construction of parts deemed necessary in carrying out my invention I wish to comprehend such substantial equivalents and substitutes as may be considered as falling fairly within the scope of my invention.

Believing that the advantages and manner of using my grating-machine have thus been made clearly apparent further description is deemed unnecessary.

Having thus fully described my invention, what I claim as new, and desire to secure by Letters Patent, is—

1. The herein-described grating-machine comprising the frame-section 1 having suitable supporting-legs and an opening 3, in combination with a removable hopper-section, said hopper-section having the downwardly-extending lips 7, said lips being provided with suitable registering apertures 9 and 10, a locking-rod 11 adapted to enter said apertures to removably secure said hopper to said frame, a grating cylinder or roller 4, supporting-bearings for said cylinder comprising the arms 13 and the shafts 14, a member 18 having an inclined upper face adapted to direct the contents of the hopper-section into engagement with the grating-roller, the inner edge thereof serving to hold said contents while being grated and suitable means to adjust the relative approximation of said member to said cylinder whereby the contents of the hopper will be finely or coarsely ground as desired, substantially as specified and for the purpose set forth.

2. The herein-described grating-machine comprising the frame-section 1 having a rectangular opening 3 and recesses 8 at each corner of said opening, in combination with a removable hopper having an extension 23 upon its upper edge and the downwardly-extending lips 7 on its lower edge, the outer ends of said lips being designed to register in the recesses 8 at each end of the opening 3, said lips also having registering apertures 9 and 10, a locking-rod adapted to enter said aperture to removably secure said hopper to said frame, a grating-cylinder located in said hopper, supporting-bearings comprising the arms 13 and shafts 14, means secured to the free end of one of said shafts to rotate said cylinder, and additional means adjustably secured to the upwardly-directed extension 23 adapted to deliver the contents of said hopper into engagement with said roller and also adapted to regulate the fineness to which said contents is to be ground, substantially as and for the purpose set forth.

In testimony whereof I affix my signature in presence of two witnesses.

HENRY CREMER.

Witnesses:
MATHIEU NADENAU,
JACOB SLOCUM.